United States Patent [19]

Slonecker

[11] Patent Number: 4,973,169
[45] Date of Patent: Nov. 27, 1990

[54] METHOD AND APPARATUS FOR SECURING INFORMATION COMMUNICATED THROUGH OPTICAL FIBERS

[75] Inventor: Mark H. Slonecker, Bel Air, Md.

[73] Assignee: Martin Marietta Corporation, Bethesda, Md.

[21] Appl. No.: 362,581

[22] Filed: Jun. 7, 1989

Related U.S. Application Data

[63] Continuation of Ser. No. 75,671, Jun. 24, 1987, abandoned.

[51] Int. Cl.$^5$ ............................................. G02B 6/28
[52] U.S. Cl. ............................. 350/96.16; 350/96.29; 350/96.30; 370/1
[58] Field of Search ............... 350/96.15, 96.16, 96.29, 350/96.30, 96.31, 96.32, 96.33, 96.34; 370/1, 3

[56] References Cited

U.S. PATENT DOCUMENTS

| | | | |
|---|---|---|---|
| 4,070,091 | 1/1978 | Taylor et al. | 350/96.31 |
| 4,237,550 | 12/1980 | steensma | 370/4 |
| 4,412,722 | 11/1983 | Carnevale et al. | 350/96.31 |
| 4,435,850 | 3/1984 | Bowen et al. | 455/606 |
| 4,436,368 | 3/1984 | Keck | 350/96.33 |
| 4,530,078 | 7/1985 | Lagakos et al. | 367/149 |
| 4,566,754 | 1/1986 | Beales et al. | 350/96.30 |
| 4,616,898 | 10/1986 | Hicks, Jr. | 350/96.15 |
| 4,630,255 | 12/1986 | Gouali et al. | 370/3 |
| 4,749,248 | 6/1988 | Aberson, Jr. et al. | 350/96.16 X |
| 4,770,492 | 9/1988 | Levin et al. | 350/96.29 |
| 4,912,523 | 3/1990 | Refi et al. | 370/1 X |

OTHER PUBLICATIONS

Technology Report, WDMs Add Channels for Existing Multimode Systems, Laser Focus/Electro-Optics, Nov. 1983, p. 68.

R. Ulrich, Polarization Stabilization on Single-Mode Fibers, appl. Phys. Lett. 35 (1979).

Giallorenzi, et al., Optical Fiber Sensor Technology, IEEE Journal of Quantum Electronics, vol. QE-18, No. 4, pp. 626-664 (Apr. 1982).

Berdague and Facq, Mode Division Multiplexing in Optical Fibers, Applied Optics, vol. 21, No. 11 (Jun. 1982), pp. 1951-1955.

H. Hoar, Design and Develop a Concentric Core Optical Fiber, Air Force Technical Report RADC TR 82-88 (Nov. 1982).

Stearns et al., Angular Division Multiplexer for Fiber Communication Using Graded-Index Rod Lenses, Journal of Lightwave Technology, vol. LT2, No. 4, pp. 358-362 (Aug. 1984).

Snyder and Love, Optical Waveguide Theory, Chapman and Hall, p. 479 (1983).

Primary Examiner—John D. Lee
Attorney, Agent, or Firm—Burns, Doane, Swecker & Mathis

[57] ABSTRACT

This invention relates to a technique for protecting information from intrusion that is transmitted through optical fiber. The new method relates to transmitting energy at multiple wavelengths along a single mode optical fiber. The wavelengths can be propagated in single mode or alternatively n single mode or in high order mqdes. Energy at one or more wavelengths constitutes guard channels which have an enhanced power loss effect by selection of an appropriate cut-off wavelength of the single mode optical fiber. These guard channels can be monitored for power loss to detect intrusion. An apparatus is also described.

20 Claims, 3 Drawing Sheets

BLOCK DIAGRAM OF IROC CONCEPT

FIG. 1
SINGLE-MODE FIBER DESIGN FOR
SINGLE-MODE OPERATION AT LONG LAMBDA

FIG. 2
SINGLE-MODE FIBER TRANSMISSION AS A
FUNCTION OF WAVELENGTH AND BEND RADIUS

FIG. 3
BLOCK DIAGRAM OF IROC CONCEPT

FIG. 4
OPTICAL POWER DISTRIBUTION IN
SINGLE-MODE FIBER OPTIC

FIG. 5

SINGLE-MODE FIBER
BEND LOSS THEORY

FIG. 6

THEORETICAL BEND ATTENUATION OF LIGHTWAVE
TECHNOLOGY FIBER AT TWO WAVELENGTHS

METHOD AND APPARATUS FOR SECURING INFORMATION COMMUNICATED THROUGH OPTICAL FIBERS

RELATED APPLICATION

This is a continuation of copending U.S. patent application Ser. No. 07/075,671, filed on June 24, 1987, by Mark H. Slonecker, for METHOD AND APPARATUS FOR SECURING INFORMATION COMMUNICATED THROUGH OPTICAL FIBER (now abandoned).

BACKGROUND AND SUMMARY OF THE INVENTION

This invention relates to a technique for protecting information transmitted through optical fibers from intrusion. The invention also relates to an apparatus for achieving such protection.

Optical fiber technology is becoming an increasingly important means to transfer information from one location to another. In many situations this information must be protected from intrusion. Optical fibers do not provide any inherent intrusion protection, and the information propagating in the fiber can be extracted from the fibers.

One method used to overcome this problem is to encrypt data. Encryption techniques, currently used in both electrical and optical systems, are complex, expensive, and require extensive security measures. However, encryption requires careful protection of key codes and requires physically protecting the medium. Recently, methods have been developed to make optical fiber systems more immune to intrusion, potentially eliminating the need for encryption units for some uses. Such techniques are described below. While these techniques offer some advantages, implementation of these techniques is complex and requires special fiber optic components. The object of this invention is to provide a relatively simple, low-cost approach for a secure fiber optic communication link that has enhanced sensitivity to intrusion.

The requirement to transmit sensitive information between secure facilities separated by an unsecure environment has led to the development of techniques to either safeguard the information itself or safeguard the transmission medium upon which the information is passed. As mentioned, the information itself may be safeguarded by encryption.

One approach is to detect intrusion attempts in the system, and provide for an alarm and immediate shutdown of sensitive transmissions in event of intrusion. Examples of such techniques include pressurized conduits, electrical capacitance sensors, and video cameras. The medium may be physically protected by hardening the medium or presenting a physical hazard to anyone attempting an intrusion. Encasement in concrete would represent an example of medium hardening. An example of a physical hazard would be a guard dog. Physical protection of the medium suffers the disadvantage the maintenance of the transmission channel may be difficult, and such techniques do not lend themselves to flexible development of such systems.

Optical fiber technology offers several characteristics advantageous to secure transmission of information. Such characteristics include the relative difficulty of collecting optical power radiated by an optical waveguide, the possibility of high data rates, the long transmission spans possible with fiber optics, low weight for tactical uses, and the possibility of constructing intrusion detecting fiber optic links which may eliminate encryption requirements in some uses.

Emissions radiated by an optical waveguide cannot be coupled by copper or metallic waveguides; they must be collected and detected optically. Tapping schemes relying upon coupling of radio frequency information are less useful with optical waveguides, due to the extremely high frequency of an optical carrier. Detection of any radiation must employ sensitive photodetectors specifically optimized for the wavelength and data rate of the transmission.

The attributes that have been responsible for the widespread acceptance of fiber optics as a transmission medium for long distance telecommunications, subscriber loops, and local area networks are also applicable to secure links. Single mode fibers have enabled transmission of data at rates in the gigabit per second range. Low attenuation on the order of 0.2 dB per kilometer yields long distance repeaterless transmission.

The preceding technologies are not considered optimum candidates for an effective Intrusion Resistant Optical Communication (IROC) data network, despite the fact that they offer some intrusion resistance. The techniques all suffer from one or more of the following disadvantages: inadequate intrusion sensitivity, nonstandard parts, limited link span, limited data rate, poor performance with temperature extremes or tendencies for false alarms. In contrast, the present approach offers enhanced sensitivity to intrusion attempts while maintaining the advantages accrued by using standard, commercially available single mode fiber optic components.

The terms intrusion resistance and intrusion detecting are used somewhat synonymously in this discussion. The fiber optic communication schemes described offer resistance to the interception of data by detecting intrusion attempts.

Intrusion detection schemes using Optical Time Domain Reflectometry (OTDR) and received power level sensing simply detect the loss of optical power propagating in the waveguide, which is a necessary consequence of the extraction of optical power required before the signal may be tapped.

Optical time domain reflectometry provides a sensitive measurement of the optical power scattered or reflected by the fiber of in-line components back toward the source. The output of the source is directly modulated by the data and is guided into a link fiber by a directional coupler. Any reflected light generated within the fiber is guided back to the directional coupler, where it is split and directed to the source and to the photodetector. The light directed to the laser source is dissipated as heat, but it may also induce radio frequency oscillations in the laser output. For this reason, it is often desirable to isolate the source from the returned light by placing some polarization control, such as a quarter-wave plate or quarter-beat length polarizing fiber, between the source and the directional coupler.

The light reflected within the optical fiber is largely due to scattering, which is scattering from fiber inhomogeneities in size roughly equal to the wavelength of light. Light may also be returned by reflections due to refractive index differentials across a boundary such as a connector or splice. In particular, if the link fiber is bent anywhere along its length in an attempt to extract optical power to read the signal, the bend will generate a return wave down the fiber.

This reflection generates a characteristic signature in the photodetector output which may be interpreted as in intrusion attempt. Additionally, the location of the bend may be calculated by multiplying the speed of propagation in the fiber by the propagation time delay from the bend to the detector.

The received power level sensing technique is a simple adaptation of OTDR to monitor the optical power throughput of the fiber. The output of the fiber is split by a beamsplitter or directional coupler. Part of the output is directed to the photodetector, where the signal is detected. The remaining part is directed to an optical power meter, which continuously monitors the power output of the fiber. If some of the light in the fiber is coupled out by a tap, the power meter detects the decrease in power throughput.

The major disadvantage for the OTDR and power level sensing approaches is that they lack the resolution necessary to reliably detect a successful bending tap. In addition, the techniques are difficult to implement for many uses, such as star networks or linear busses.

Power level detection intrusion detection techniques are made more resistant to tapping by operating the transmission in the "whisper mode". See U.S. Pat. No. 4,435,850, hereby incorporated by reference. To operate in "whisper mode", the optical carrier is modulated by a signal with a peak-to-peak amplitude many orders of magnitude smaller than the amplitude of the carrier, which is of such high frequency that it appears as a DC component to the photodetector. The DC component is strong enough to swamp out all noise mechanism in the receiver, such as thermal noise and amplifier front end noise. The remaining noise component is quantum noise, and is a function only of received signal power, given a fixed detector responsivity and bandwidth. The signal current out of the detector is a function of both received power and modulation index. Therefore, the modulation index may be set to give any desired signal-to-noise ratio. This enables the signal-to-noise ratio to be set as low as tolerable by keeping the modulation index arbitrarily low. Because the power coupled out of a bending tap is orders of magnitude less than the power to the receiver, the resulting signal-to-noise ratio of the extracted signal is too low to reliably reconstruct the signal. However, "whisper mode" operation limits total link distance possible, and limits bit-error-rate times data rate product.

Concentric core fibers may be used to protect secure information by surrounding the secure optical data channel with a concentric optical guard band carrying unclassified information. A special fiber with two cores is used as the transmission medium. The central core is colinear with the axis of the fiber, and is used to carry the secure information. Theoretically, the central core may be multimode or single mode, step index or graded index, but fabrication difficulties practically limit the construction to the multimode, step index design. Surrounding the central core and concentric with it is a second core region, separated from the central core by a cladding band of refractive index lower than that of the two cores. The second core is of necessity multimode and step index, and is used to carry the optical guard band. When bends or microbends are used to extract the secure signal, the guard band signal is coupled out and attenuated before the signal band. By continuously monitoring the guard band for unexpected attenuation, the secure transmitters can be shut down during an intrusion attempt.

This fiber is disadvantageous because it comprises expensive dual core fiber and complicated input/output optical coupler. See H. Hoar, *Design and Develop a Concentric Core Optical Fiber*, Air Force Technical Report RADC TR 82-88 (Nov. 1982), hereby incorporated by reference.

The coupler requires a great deal of hand craftsmanship to assemble and is therefore expensive to produce. The approach also requires well designed fiber to minimize cross-talk or leakage of the signal band into the guard band. It is also difficult to use in tactical uses due to difficulty in splicing or connectorizing. Any small misalignment in the fibers during connectorization or splicing contributes to cross-talk. Additionally, the use of multimode step index designs for the central core leads to a low upper limit for link distance and data rates. The concentric core fiber is also potentially susceptible to compromise by laser drilling. Utilization of the design to a star network or linear bus would be difficult because of the need for directional couplers, which would be difficult to implement in this design.

Another technique concerns high order and low order mode groupings which are excited in multimode fibers. High order mode groupings are more sensitive to intrusion than others. Some disadvantages involve a need for specialized couplers to separately excite high and low order modes. See Berdague and Facq, *Mode Division Multiplexing In Optical Fibers*, Applied Optics. Vol. 21, No. 11 (June 1982), hereby incorporated by reference.

Modal biplexing technology enables the use of an optical guard band around and concentric with the signal in commercially available multimode fibers. With modal biplexing, the secure information channel is optically injected into the low order guided modes. The guard bank is optically injected into the high order guided modes. Resistance to intrusion by bending taps follows from the fact that high order modes become radiative before low order modes when the fiber is bent. While in principle, modal biplexing may be used with commercially available fibers, excessive cross-talk between high order and lower order modes prohibit links of any appreciable distance. For superior mode isolation over long distances, it is necessary to use a fiber with a specially designed refractive index profile.

Preferential modal injection may be accomplished by using multimode fused biconical taper couplers, by using spatial filters, or by using angular division multiplexers.

Fused biconical taper (FBT) couplers are directional couplers made by fusing two bare optical fibers with heat and pulling the fused fibers lengthwise to induce a down-taper and up-taper in the fiber. The fused taper region acts as a mode mixer to redistribute light in the coupler.

Due to the peculiarities of lightwave propagation in a tapered optical fiber, the coupling of light from the input (or throughput) to the tap-off fiber depends on which mode the light is propagating in. Light propagating in high order modes is readily coupled into the tap-off fiber. Low order modes, however, will not couple into the tap-off fiber, but remain in the throughput fiber. Therefore, the light propagating in the tap-off fiber is deficient in low order modes but well populated by high order modes, and light propagating in the input fiber is predominantly low order, although some greatly attenuated high order modes still remain. The FBT coupler can then be used as a modal biplexer. The secure signal is injected into the input end of the throughput fiber of the coupler after first being passed through a modal filter to strip off the high order modes (a simple taper in the input fiber works effectively as a modal filter). The signal then passes through the fused biconical taper coupler, remaining as low order modes on the throughput fiber. The guard bank is injected into the tap-off fiber, where it is coupled into the input fiber as high order modes. From this point, the high order guard band and the low order mode secure signal propagate simultaneously and independently on the same filter.

Another method of preferential modal injection is the use of spatial filters. This technique is taught in the Berdague et al. article. A lens may be used to Fourier transform the output of an optical fiber into its spatial frequency components. A filter introduced in the Fourier plane may be configured to filter out either the high order or the low order components.

When step index multimode fiber is used, the angle of incidence of the injecting ray upon the fiber end is directly proportional to the mode number of the resulting stimulated mode. For this type of fiber, then, angular division multiplexers may be used for modal biplexing. A device of this type is described in R. D. Stearns, C. K. Awawa, and S. K. Yao, *Angular Division Multiplexer for Fiber Communication Using Graded-Index Rod Lenses*, Journal of Lightwave Technology, Vol. LT-2, No. 4, pp. 358–362 (Aug. 1984).

The modal biplexing approach has been demonstrated, but it suffers disadvantages in certain uses. It requires special input couplers or filters. The maximum link distance is limited to less than the mode coupling length of the fiber, usually less than one kilometer. The use of multimode fiber implies a limited data rate due to modal dispersion. The method is not suitable for networking due to the difficulty in implementing the interconnects. In addition, splices, connectors, and star couplers are all modally sensitive interconnects, so that at best, they will attenuate the high order modes more strongly than the low order modes, reducing the margin of security. At worst they act as mode scramblers and generate excessive cross-talk.

If the two legs of a single mode fiber optic Mach-Zender interferometer are used as the transmission medium for the optical signal, then the interference pattern at the output may be monitored for evidence of fiber perturbation. Fiber optic interferometers have been the subject of widespread research for their capabilities as highly sensitive detectors of external fields such as acoustic pressure fields and magnetic fields, and for detecting angular rotation. T. G. Giallorenzi, J. A. Bucaro, A. Dandridge, G. H. Siegel, J. H. Cole, S. C. Rashleight, and R. G. Priest, *Optical Fiber Sensor Technology*, IEE Journal of Quantum Electronics, Vol. QE-18, No. 4, pp. 626–664 (April 1982), hereby incorporated by reference.

In this technique, the reference fiber is encased in an environment where it cannot be perturbed in any way. Any perturbation of the link fiber by pressure or bending induces a small optical path length change in the fiber, which phase modulates the coherent light propagating in the single mode fiber.

Detection of optical path length changes on the order of a fraction of the light wavelength (and therefore very small fiber bends) is possible by comparing (using interferometry) the modulated phase of the link fiber with the unmodulated phase of the reference fiber. If "whisper mode" of operation is used, the interference of the DC outputs of the two interferometer arms can be monitored for changes in fringes. This approach provides extreme sensitivity to intrusion attempts, but tactical implementation may be difficult due to environmental effects. The fiber optic interferometer is very sensitive to environmental perturbations such as temperature fluctuations, magnetic fields, and ambient acoustic noise. In order to maintain maximum sensitivity of the system, it is necessary that the polarizations of the two outputs of the link and reference fiber be aligned. This requires either expensive polarization maintaining fiber and couplers, or some form of adaptive polarization controller, which currently exists only as a laboratory concept.

A polarization multiplexing technique involves two degenerate orthogonal modes of a single mode polarization maintaining fiber excited with a data and guard signal. Bending the fiber to extract data scrambles the polarization and modes detection difficult. Disadvantages involve the need for expensive polarization—maintaining fiber and complicated polarizing input/output couplers. See R. Ulrich, *Polarization Stabilization on Single-Mode Fibers*, Appl. Phys. Lett. 35 (1979), hereby incorporated by reference.

Polarization sensing intrusion detection techniques exploit the fact that single mode fibers propagate two degenerate modes at orthogonal polarizations. Light input into a single mode fiber may be preferentially injected into one of the two polarization axes. If a low birefringence fiber with a beat length equal to or greater than the separation between the transmitter and receiver is used, then the output of the fiber will have the same polarization state and orientation as the input, as long as the fiber is not perturbed in any way. If the fiber is moved or perturbed, as it would be in a intrusion attempt, then the change on polarization change at the output would be detected. Typically, a polarizing beamsplitter is used to separate the two polarizations output by a fiber. Alarm electronics then compare the two detector outputs for evidence of polarization mode cross-coupling.

The polarization sensing technique has several disadvantages. Fibers are not currently available having beatlengths greater than 150 m and fibers with beatlengths exceeding 500 m will be extremely difficult to fabricate, even using the spinning preform technique. Should such fibers become available in the future however, the capability of the fiber to maintain its polarization state during environmental changes is questionable. Temperature changes, for example, will most likely cause polarization rotation in the fiber, which could be interpreted by the receiver as an alarm condition. An additional disadvantage is that the implementation may require the use of bulk optic polarizers and beamsplitters.

Coherent fiber optic receivers, in which the output of a single mode fiber is mixed with the output of a local oscillator before detection by a photodiode, allow quantum-limited detection of a weak signal. As in "whisper mode" operation, this technology allows quantum-limited detection of a weak signal by swamping the thermal noise and front-end noise of the detector with strong DC bias. In the "whisper mode" technique, the DC optical bias that makes this possible is transmitted along the fiber with the signal. In the coherent transmission scheme, the DC bias results from the local oscillator, which is housed in the same secure environment as the receiver.

Coherent techniques do not in themselves provide intrusion detection. However, they do provide intrusion resistance because the transmitter may be operated at an output power that just exceeds the threshold for adequate signal-to-noise ratio at the receiver. Because power coupled out of the waveguide by a bend will be orders of magnitude less than the level at the signal output of the fiber, the signal-to-noise ratio at the tap may be insufficient to reconstruct the signal.

While coherent transmission technology may in the future prove useful of intrusion-resistant fibers, a number of obstacles currently make its use in the field impractical. As with the interferometric techniques, polarization control is necessary to ensure the polarization alignment of the link fiber output with local oscillator laser output. The technique requires the high spectral purity of expensive narrow linewidth lasers such as distributed feedback lasers or cleaved coupled cavity lasers. To date, the only demonstrations of this technology have been in the laboratory.

The technologies surveyed all attempt to exploit the fundamental advantages of optical fiber technology in intrusion-resistant fiber optic communications links. However, each suffers from one or more serious disadvantages: inadequate intrusion sensitivity, nonstandard parts, limited link distance, limited data rate, or excessive sensitivity to environmental variations. A unique new intrusion detection method which overcomes these problems has been discovered.

SUMMARY OF THE INVENTION

The present invention offers a number of important advantages over previous IROC schemes described above. These advantages are summarized as follows:

Ultra High Security—The degree of security provided as many orders of magnitude greater than one approaches.

High Bandwidth—Because single-mode fiber is used, information rates up into the GHz range are realizable.

Long Distance—Because low loss single-mode fiber is employed, unrepeatered link distances over 10 km are possible. Longer link distances might also be possible because of the high degree of security provided.

Wider Alarm Threshold—The high intrusion resistance obtained with the approach allows the alarm threshold to be set over a wider range of optical power levels than with other schemes. This greatly reduces false alarm rate, yet still maintains a very high degree of security.

Channel Independence—Due to the nature of the single-mode approach, the operation of the guard and secure data channels are totally independent of each other. There is no requirement that the guard and data channels be operated at the same carrier frequency. For example, the data channel may transmit high speed analog data in the GHz range generated either with direct or external laser modulation, and the guard channel may transmit a lower frequency guard signal generated via an LED. This is just one example of the flexibility permitted by the invention.

Known Physical Principles—The invention uses well-known and well understood properties of optical fiber wave propagation peculiar to single mode fiber. The fact that a single mode fiber will exhibit a known bend loss as a function of its cut-off wavelength has been studied and reported. The invention is based on this wavelength-dependent property, and it effectively combines two wavelengths onto a fiber with the appropriate cutoff wavelength to achieve the desired effect.

Standard Components—As a result of the simplicity of the proposed concept, existing optical fiber components can be readily implemented. No fiber component development effort is required in any aspect of the proposed approach. Commercially available fiber is easily obtained with cutoff wavelengths in the desired range. Standard sources can be used as well as standard receivers. In addition, single-mode couplers are available.

Thus, the present invention overcomes deficiencies of the background art mentioned above. The invention relates to a method for wavelength division multiplexing in single-mode optical fiber comprising:

transmitting optical energy simultaneously at multiple wavelengths through a single-mode optical fiber means having a cut-off wavelength; and selecting the cut-off wavelength to enhance optical power loss effect of a wavelength.

The invention further relates to an intrusion resistant optical communication method using wavelength division multiplexing in single-mode optical fiber comprising:

transmitting optical energy simultaneously at multiple wavelengths through a single-mode optical fiber means having a cut-off wavelength;

propagating first and second wavelengths in single mode, the first wavelength being greater that the second wavelength; and selecting the cut-off wavelength of the optical fiber means to be less than the second wavelength and to enhance optical power loss effect of the first wavelength.

The invention further relates to an intrusion resistant optical communication method using wavelength division multiplexing in single-mode optical fiber comprising:

transmitting optical energy simultaneously at multiple wavelengths through a single mode optical fiber means having a cut-off wavelength;

propagating a first wavelength in single mode and a second wavelength in higher order mode, the first wavelength being greater than the second wavelength; and selecting the cut-off wavelength of the optical fiber means to be greater than the second wavelength and to enhance optical energy power loss effect of the first wavelength.

The invention further relates to an apparatus for wavelength division multiplexing in single-mode optical fiber comprising:

means for transmitting optical energy through a single-mode optical fiber means having a cut-off wavelength;

means for simultaneously propagating the optical energy as multiple wavelengths;

means for propagating at least one wavelength in single mode and wavelengths in higher order modes; and means for enhancing the optical power loss effect of a wavelength by selection of the cut-off wavelength.

DETAILED DESCRIPTION OF THE INVENTION

One embodiment of the invention describes an Intrusion Resistant Optical Communication technique based on Wavelength Division Multiplexing (WDM) in single-mode optical fibers. This embodiment relates to a means where sensitive data propagating in a standard single-mode fiber at wavelength $\lambda_1$(lambda), is protected from intrusion by a guard signal propagating simultaneously in the same fiber at wavelength $\lambda_2$. Generally, wavelengths utilized in this invention are in the range of 700 to 1600 nm, but longer or shorter wavelengths can be used. The wavelengths are chosen such that:

$$\lambda_1 > \lambda_{co} > \lambda_2$$

where $\lambda_{co}$ is the cutoff wavelength of the fiber. Wavelengths longer than the cut-off wavelength propagates single mode. Wavelengths shorter than the cut-off wavelength propagate high order mode. Intrusion resistance is provided by the fact that the guard channel, $\lambda_2$, is more sensitive to fiber bends and perturbations than the secure data channel, $\lambda_1$. Monitoring of the optical power level in the guard channel thus indicates whether the link is being compromised. Appropriate actions can then be initiated if the drop of optical signal level is detected.

Single mode fibers are designed to transmit a single fundamental ($LP_{01}$) mode when light longer than the cutoff wavelength is input to the fiber. This cutoff wavelength can be specified in relation to the V number, where $$V = \frac{2\pi a}{\lambda} [n_1 - n_2^2]^{\frac{1}{2}},$$

and a=core radius and $n_1$ and $n_2$=refractive index of the core and cladding, respectively. For a fiber to be single-mode, V must be less than 2.405.

If V is greater than 2.405, then the fiber will propagate two or more modes. Thus, a desired cut-off wavelength is obtained by selection of physical parameters of different single-mode fibers. For typical high data rate long distance uses, single-mode propagation is critical. The propagation of higher order modes leads to excessive bend loss and data timing uncertainties, both of which are detrimental to high speed uses.

It is this higher mode attenuation effect that is utilized in the invention to provide intrusion detection. The concept uses a single-mode fiber which propagates two different wavelengths simultaneously, one wavelength as single-mode, and the other wavelength with a higher order mode in addition to $LP_{01}$. The longer wavelength which propagates as a single-mode contains the sensitive data. The shorter wavelength, which contains higher order modes, is used as a guard. General information about this and the following embodiment are set forth in Synder and Love, *Optical Waveguide Theory*, Chapman and Hall (1983), hereby incorporated by reference:

EXAMPLE

Figure 1:
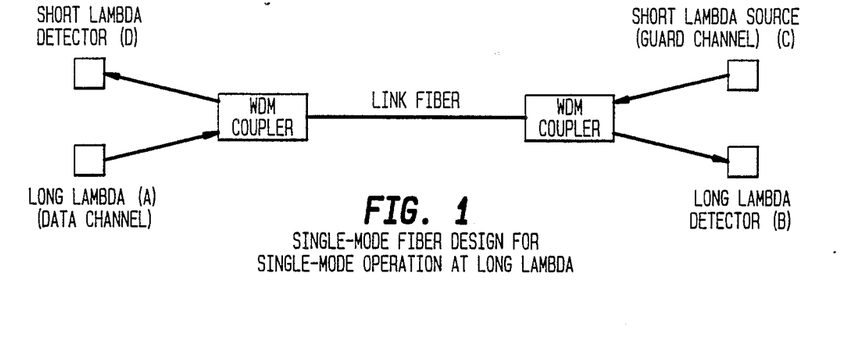
FIG. 1 shows a single-mode fiber design for single-mode operation at long wavelength source.
Figure 2:
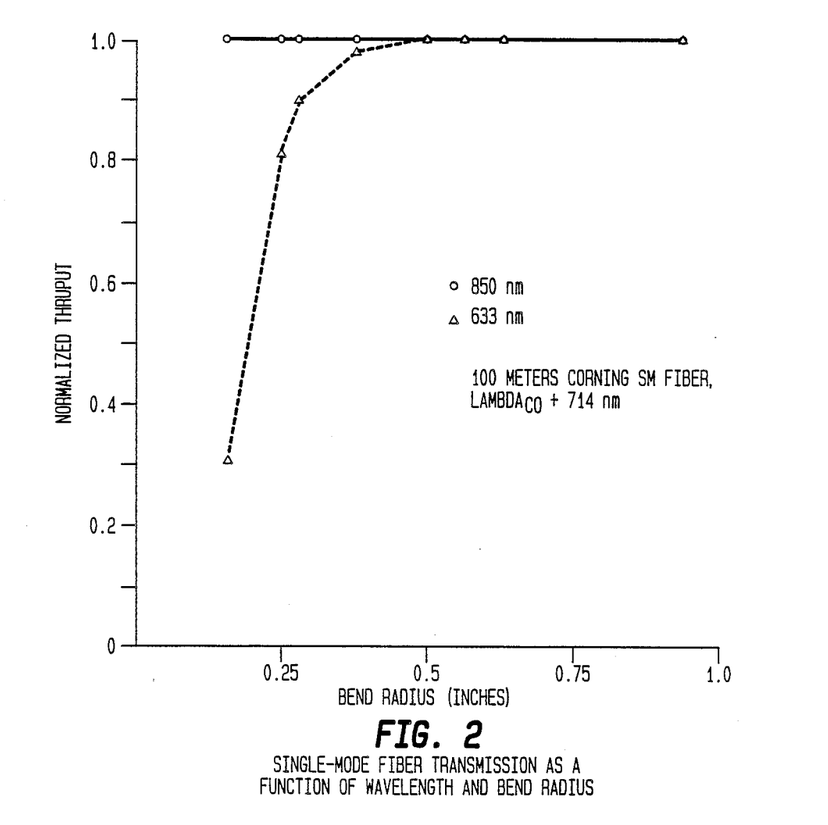
FIG. 2 shows single-mode fiber transmission as a function of wavelength and bend radius.

One implementation of this approach is shown in FIG. 1. Here, the link fiber is chosen so that the long wavelength source propagates single-mode and carries the sensitive data from A to B. The short wavelength source is chosen so that it will propagate higher order modes on the same link fiber from C to D. Bidirectional WDM single-mode commercially available couplers are used at both ends of the link fiber for maximum coupling efficiency. The transmission quality of the long wavelength data channel A to B would be relatively unaffected by fiber tampering. The short wavelength channel C to D transmits a continuous guard-signal. Because the shorter wavelength propagates with higher order modes, bending the fiber will cause the higher order mode to become lossy. When bending occurs in an attempt to extract the sensitive data, the short wavelength detector immediately senses a large reduction in optical power and the system directs the long wavelength source to stop transmitting. The loss of power in the higher order mode is a strong function of fiber bend radius, and this provides a simple and efficient means to detect an intrusion without the use of exotic fibers or couplers. This functional relationship is shown in FIG. 2.

All of the components identified in the system are readily available. The sources can be either light emitting diodes (LED) or laser diodes (LD). LED's offer lower cost while LD's provide high speed and greater optical power.

The detectors can either be positive-intrinsic-negative (PIN) photodiodes or avalanche photodiodes (APD's) where PIN's are the lower cost component while APD's provide greater sensitivity. Standard off-the-shelf telecommunications fiber can be used. WDM single-mode couplers are available from several vendors.

One component implementation of the above embodiment is the following:

| | |
|---|---|
| long wavelength source | 1300 nm LED |
| long wavelength detector | Ge PIN |
| short wavelength source | 850 LED |
| short wavelength detector | Si PIN |
| single-mode fiber | lambda cut off = 1100 mm |
| WDM couplers | Fused biconical taper |

Another embodiment of the invention is based on the same basic single-mode WDM principles. This embodiment is preferred. The wavelengths, however, are chosen such that:

$$\lambda_2 > \lambda_1 > \lambda_{co}$$

As with the first embodiment, intrusion resistance is provided by the guard channel, $\lambda_2$, being more sensitive to fiber bends and perturbations that the secure data channel, $\lambda_1$. More than one guard channel may be used in either embodiment.

However, the specific optical fiber wave propagation properties which are responsible for the two IROC techniques providing intrusion resistance are distinctly different from one another. The following describes a second IROC embodiment. The second embodiment provides improved sensitivity compared with the prior embodiment described above.

Figure 3:
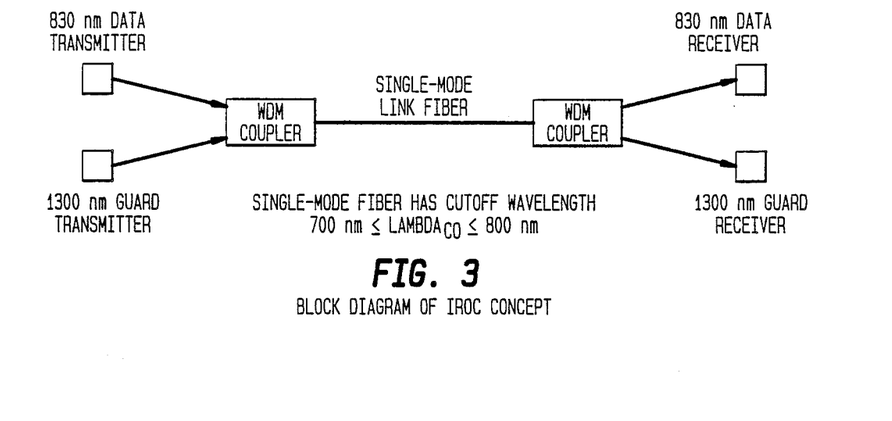
FIG. 3 is a block diagram of an alternative embodiment of the IROC concept of the present invention.

A block diagram of the alternative IROC embodiment is shown in FIG. 3. Standard telecommunications type single-mode optical fibers are used and operated at two different wavelengths. The shorter wavelength, 830 nm, is used to transmit the secure data and is referred to as the secure data channel. The longer wavelength, 1300 nm, transmits a nonsecure signal which is used to guard or protect the secure data channel. The 1300 nm channel, referred to as the guard channel, provides the guard function because it is more sensitive to fiber bends and other perturbations that the 830 nm data channel. Any attempt to extract the 830 nm data causes a significant decrease in optical power in the 1300 nm guard signal long before any decrease can be detected in the data signal. Appropriate alarm functions can be designed to turn off the 830 nm data transmitter should a significant reduction in the 1300 nm guard signal be detected.

To obtain desired guard channel effect in the fiber, the cut-off wavelength of the single-mode fiber must be below 830 nm. If the cut-off wavelength is between 700 and 800 nm, then the 830 nm channel will be operating just above cut-off, and the mode will be tightly guided within the core. The 1300 nm channel, however, will be operating far above cut-off, and as a consequence, will be weakly guided by the core. The result is that the 830 nm channel is very insensitive to fiber perturbations, which provides good data security, whereas the 1300 nm channel is very sensitive, as required for an effective guard channel.

Figure 4:
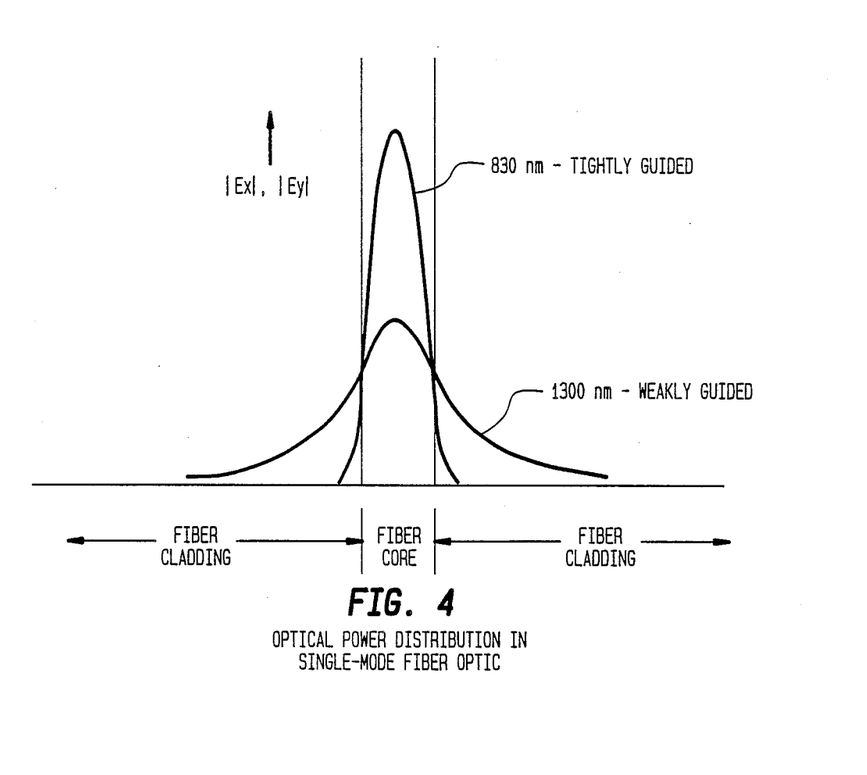
FIG. 4 shows optical power distribution in single-mode fiber optic.

The basis for the concept can also be explained by considering the magnitude and relative position of the two modes within the fiber. FIG. 4 shows a cross-sectional view of a single-mode fiber with the 830 nm and 1300 nm modes superimposed. The 830 nm mode is tightly guided by the fiber core with very little of its evanescent field extending into the cladding. The 1300 nm mode, however, is weakly guided by the fiber core and a considerable amount of the energy propagates in the cladding, propagation in the cladding being known as the evanescent field. It is important to note that although the 1300 nm mode is spread out appreciably, it still propagates single-mode and maintains its low attenuation characteristics. Because the mode is spread out, it is much more sensitive to bends and other perturbations which cause the mode to spread out even further, eventually causing attenuation of the long wavelength mode, even when the short wavelength mode which carries the secure data channel is unaffected.

All of the components and fiber required to implement this concept are commercially available. Transmitters can either be LEDs or laser diodes, depending upon the desired system data rate and distance requirements. The wavelength division multiplexing couplers, used to efficiently couple the two wavelengths onto and off the link fiber, are available from several vendors. The single-mode link fiber is a standard off-the-shelf fiber available from a number of different manufacturers. The receivers could be either PIN diodes or APDs, again depending on the data rate and distance requirements. No special component development efforts are required to implement the concept.

To determine sensitivity of the present approach to an attempted intrusion, a theoretical analysis was performed. See Snyder and Lover, *Optical Waveguide Theory*, Chapman and Hall, pp. 479 (1983). Light propagating in an optical fiber can be extracted using a variety of different techniques. However, the simplest and most straightforward technique to analyze theoretically is the case of a symmetric 360 degree bend or loop in the fiber. This is illustrated below.

Figure 5:
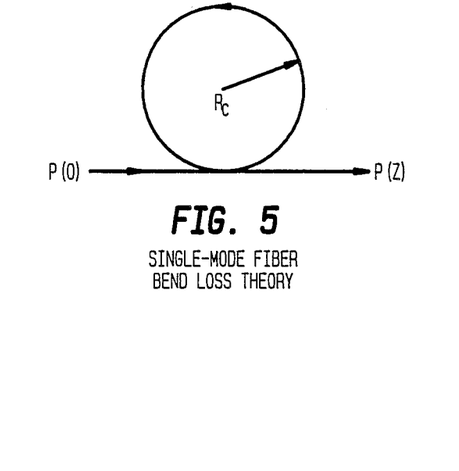
FIG. 5 illustrates single-mode fiber bend loss theory.

Consider light propagating in a single-mode fiber passing through a symmetric bend of radius R, (see FIG. 5). If P(O) is the initial optical power propagating in the fiber, and P(Z) is the optical power propagating in the fiber after passing through the bend, then P(Z) can be expressed as follows $$P(Z) = P(O) \exp(-\gamma z)$$

where $Z = 2\pi R$ and $$\gamma = \frac{\pi^{\frac{1}{2}}}{2r} \frac{(r)^{\frac{1}{2}}}{(R)} \frac{V^2 W^{\frac{1}{2}}}{U^2} \exp \frac{(4RW^3\Delta)}{(3rV^2)}$$

The term $\gamma$, called the power attenuation coefficient, is an exponential function of the following fiber parameters:

r = Core radius
R = Bend radius
$V = 2\pi r(n^2 \text{ core} - n^2 \text{ clad})^{\frac{1}{2}}$
$V^2 = U^2 + W^2$ $$\Delta = \frac{n_{core} - n_{clad}}{n_{core}}$$

where $n$core = Core refractive index
and $n$clad = Cladding refractive index

Using Equations 1 and 2 above, the theoretical optical power throughput for various bend diameters was calculated for a typical fiber at the two wavelengths of interest. Single mode fiber parameters from a standard off-the-shelf fiber from Lightwave Technologies Incorporated (LTI) were used in the calculations. The parameters for the LTI fiber are listed below in Table 1.

TABLE 1

| Lightwave Technology Single Mode Fiber Parameters | | |
|---|---|---|
| Parameter | 830 nm | 1300 nm |
| V | 2.20 | 1.41 |
| U | 1.59 | 1.26 |
| W | 1.52 | 0.61 |
| Δ | 0.0041 | 0.0041 |
| r (microns) | 2.2 | 2.2 |

Figure 6:
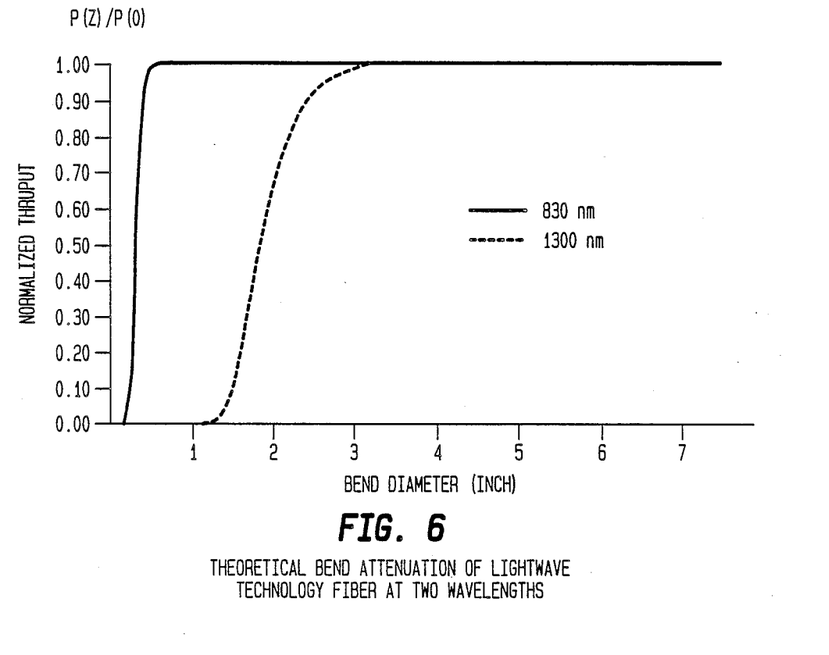
FIG. 6 depicts theoretical bend attenuation of lightwave technology fiber at two wavelengths.

The theoretical response, shown in FIG. 6, plots the normalized throughput power, P(Z)/P(O), as a function of fiber bend diameter for 830 nm and 1300 nm. Light propagating at 1300 nm is far more sensitive to bends than the 830 nm light. As the fiber bend diameter approaches 3 inches, the 1300 nm channel begins to lose light. Its optical power continues to drop until all of the light is eventually lost at approximately 1-inch bend diameter. At the same time, the 830 nm light remains essentially unchanged. Even at a 1-inch bend diameter, the 830 nm channel throughput has not measurably decreased. These theoretical results are very encouraging because the predicted effect provides very high sensitivity to intrusion. In addition, it allows the alarm threshold to be set on the 1300 nm channel over a much wider range than is possible with the mode-biplexing scheme.

Experimental studies conducted in accordance with the invention as described herein have confirmed the existence of a high degree of correlation between experimental results and those predicted by the foregoing theoretical discussion.

Although the invention has been described in conjunction with specific embodiments, it is evident that many alternatives and variations will be apparent to those skilled in the art in light of the foregoing description. Accordingly, the invention is intended to embrace all of the alternative and variations that fall within the spirit and scope of the appended claims.

What is claimed is:

1. A method for wavelength division multiplexing in single-mode optical fibers comprising:
   transmitting optical energy simultaneously at multiple wavelengths through a single core, single mode optical fiber having a cut-off wavelength; and
   selecting the cut-off wavelength to enhance optical energy power loss of one of said wavelengths with respect to others of said wavelengths.

2. The method according to claim 1, further comprising monitoring the optical power energy of at least one wavelength of the transmitted multiple wavelengths.

3. The method according to claim 2, further comprising interrupting transmission of substantially unattenuated energy at at least one of the multiple wavelengths.

4. The method according to claim 1, wherein energy at at least two wavelengths is propagated.

5. The method according to claim 1, further comprising discerning optical power loss by disturbance to the optical fiber.

6. The method according to claim 5, wherein the disturbance results from bending the optical fiber.

7. The method according to claim 1, wherein a first wavelength of the multiple wavelengths is longer than a second shorter wavelength.

8. The method according to claim 7, wherein the long wavelength is about 1300 nm and the short wavelength is about 850 nm.

9. The method according to claim 8, wherein the cut-off wavelength of the optical fiber is between about 1000 nm and 1100 nm.

10. The method according to claim 8, wherein the cut-off wavelength of the optical fiber is between about 600 nm and 850 nm.

11. The method according to claim 8, wherein the cut-off wavelength of the optical fiber is between about greater than 1300 nm and about 1550 nm.

12. The method according to claim 8, wherein the cut-off wavelength of the optical fiber is between about 1200 nm and less than about 1300 nm.

13. The method according to claim 7, wherein the cut-off wavelength of the optical fiber is less than the short wavelength.

14. The method according to claim 7, wherein the cut-off wavelength of the optical fiber is greater than the short wavelength.

15. An intrusion resistant optical communication method using wavelength division multiplexing in single core, single-mode optical fiber comprising:
   transmitting optical energy simultaneously at multiple wavelengths through a single core, single mode optical fiber having a cut-off wavelength;
   propagating first and second wavelengths in single mode, the first wavelength being greater than the second wavelength; and
   selecting the cut-off wavelength of the optical fiber to be less than the second wavelength and to enhance optical energy power loss of the first wavelength with respect to the second wavelength.

16. An intrusion resistant optical communicator method using wavelength division multiplexing in single core, single-mode optical fiber comprising:
   transmitting optical energy simultaneously at multiple wavelengths through a single core, single mode optical fiber having a cut-off wavelength;
   propagating a first wavelength in single mode and second wavelength in higher order mode, the first wavelength being greater than the second wavelength; and
   selecting the cut-off wavelength of the optical fiber to be greater than the second wavelength and to enhance optical energy power loss of the first wavelength with respect to the second wavelength.

17. An apparatus for wavelength division multiplexing in single core, single-mode optical fiber comprising:
   means for simultaneously propagating optical energy as multiple wavelengths;
   means for propagating at least one wavelength in single-mode and wavelengths in higher order modes; and
   means for enhancing the optical energy power loss of one of the wavelengths by selection of the single-mode optical fiber having a predetermined cut-off wavelength.

18. The apparatus according to claim 17, further comprising means for monitoring the optical power of each wavelength.

19. The apparatus according to claim 18, further comprising means for interrupting transmission of an unattenuated wavelength.

20. A method for wavelength division multiplexing in a single-mode optical fiber comprising:
   selecting the single-mode optical fiber having a desired cut-off wavelength to enhance optical energy power loss of one wavelength with respect to other wavelengths; and
   transmitting optical energy substantially simultaneously at multiple wavelengths through said selected single-mode optical fiber.

* * * * *